(12) United States Patent  (10) Patent No.: US 9,114,848 B2
Scolari et al.  (45) Date of Patent: Aug. 25, 2015

(54) PEDAL-DRIVE SYSTEM FOR MANUALLY PROPELLING MULTI-WHEELED CYCLES

(75) Inventors: Nathan Anthony Scolari, Greenville, SC (US); Gregory John Owoc, Greenville, SC (US)

(73) Assignee: ZIKE, LLC, Greenville, SC (US)

( * ) Notice: Subject to any disclaimer, the term of this patent is extended or adjusted under 35 U.S.C. 154(b) by 1010 days.

(21) Appl. No.: 12/554,366

(22) Filed: Sep. 4, 2009

(65) Prior Publication Data

US 2011/0057412 A1  Mar. 10, 2011

(51) Int. Cl.
*B62M 1/26* (2013.01)
*B62K 3/00* (2006.01)
*B62M 3/00* (2006.01)

(52) U.S. Cl.
CPC .................. *B62M 1/26* (2013.01); *B62K 3/002* (2013.01); *B62M 2003/006* (2013.01)

(58) Field of Classification Search
CPC .......... B62K 3/002; B62M 1/36; B62M 3/06; B62M 1/26; B62M 2003/006
USPC .......... 280/220, 221, 259, 260, 261, 257, 282
See application file for complete search history.

(56) References Cited

U.S. PATENT DOCUMENTS

| | | | |
|---|---|---|---|
| 211,868 A | 2/1879 | Smith | |
| 272,377 A | 2/1883 | Davis | |
| 286,180 A * | 10/1883 | Cooper | 280/256 |
| 564,948 A | 7/1896 | Stover | |
| 595,535 A | 12/1897 | Edwards | |
| 597,621 A | 1/1898 | Russell | |
| 608,674 A | 8/1898 | Harshner | |
| 612,865 A | 10/1898 | Muslar | |
| 617,390 A | 1/1899 | Beebe | |
| 636,658 A | 11/1899 | Grace | |
| 647,982 A | 4/1900 | Owen | |
| 732,553 A | 6/1903 | Hider | |
| 813,741 A | 2/1906 | Rudbeck | |
| 1,272,761 A | 7/1918 | Bailey | |
| 1,277,161 A * | 8/1918 | Weber | 74/47 |
| 1,283,819 A | 11/1918 | Lee | |
| 1,330,011 A | 2/1920 | Russo | |
| 1,342,791 A | 6/1920 | Light | |
| 1,388,004 A | 8/1921 | Schmit | |

(Continued)

FOREIGN PATENT DOCUMENTS

CN  2661545  12/2004
CN  101105220  1/2008

(Continued)

*Primary Examiner* — Anne Marie Boehler
(74) *Attorney, Agent, or Firm* — David L. King

(57) ABSTRACT

A pedal-drive system for propelling multi-wheeled cycles includes two pedal level arms connected to a pair of two-bar linkages, which are drivingly attached to corresponding crank pins on each respective side of a common drive spindle, perpendicular to the cycle frame. The linkages rotate the said spindle per each pedal's downward stroke so that when one pedal arm is all the way down, the opposite pedal's crank pin is already beyond full up position, thus ensuring continuous rotation of the drive system. A sprocket on the spindle drives a chain, that drives a sprocket on a back wheel. For higher speeds, a typical bicycle multi-sprocket-cone and speed changing chain-derailleur may be incorporated. The pedal system may be used for small to large manually powered cycles, particularly scooters and bicycles, and may also include an auxiliary electric motor and battery for propulsion.

19 Claims, 11 Drawing Sheets

(56) References Cited

U.S. PATENT DOCUMENTS

| | | |
|---|---|---|
| 1,477,544 A | 7/1922 | D'Antonio |
| 1,566,669 A | 12/1922 | Greene |
| 1,473,356 A | 11/1923 | Pine |
| 1,653,889 A | 11/1926 | Clark |
| 1,667,940 A | 12/1926 | Grant Life George |
| 2,053,835 A | 12/1933 | Kimball |
| 2,251,005 A | 12/1940 | Rubinich |
| 2,466,105 A | 5/1946 | Hoffman |
| 2,486,513 A | 11/1949 | Billey |
| 2,544,996 A | 3/1951 | Kander |
| 3,039,790 A | 5/1959 | Trott |
| 3,375,023 A | 11/1965 | Cox |
| 3,820,820 A | 6/1974 | Kutz |
| 3,913,945 A | 10/1975 | Clark |
| 3,954,282 A | 5/1976 | Hege |
| 4,026,571 A | 5/1977 | Vereyken |
| 4,161,328 A | 7/1979 | Efros |
| 4,186,934 A | 2/1980 | Collings |
| 4,456,276 A | 6/1984 | Botorlin |
| 4,564,206 A | 1/1986 | Lenhardt |
| 4,577,879 A | 3/1986 | Vereyken |
| 4,779,863 A | 10/1988 | Yang |
| 4,828,284 A | 5/1989 | Sandgren |
| 5,107,950 A | 4/1992 | Horiike et al. |
| 5,125,288 A | 6/1992 | Amiet |
| 5,172,926 A | 12/1992 | Mannino |
| 5,224,724 A | 7/1993 | Greenwood |
| 5,242,182 A | 9/1993 | Bizerra |
| 5,294,140 A | 3/1994 | Rinkewich |
| 5,351,575 A | 10/1994 | Overby |
| 5,368,321 A | 11/1994 | Berman et al. |
| 5,383,829 A | 1/1995 | Miller |
| 5,442,972 A | 8/1995 | Hoover |
| 5,451,070 A | 9/1995 | Lindsay et al. |
| 5,492,345 A | 2/1996 | Kruczek |
| 5,520,401 A | 5/1996 | Mohseni |
| 5,527,246 A | 6/1996 | Rodgers, Jr. |
| 5,611,757 A | 3/1997 | Rodgers, Jr. |
| 5,697,627 A * | 12/1997 | Schnell ............ 280/221 |
| 5,716,069 A | 2/1998 | Bezerra et al. |
| 5,758,735 A * | 6/1998 | MacCready et al. ....... 180/206.5 |
| 5,823,554 A | 10/1998 | Lau |
| 5,899,119 A | 5/1999 | Coment |
| 5,988,662 A | 11/1999 | Staehlin |
| 6,209,900 B1 | 4/2001 | Yoshizawa |
| 6,270,102 B1 | 8/2001 | Fan |
| 6,382,043 B1 | 5/2002 | Lin |
| 6,402,173 B1 | 6/2002 | Chiu |
| 6,406,047 B1 | 6/2002 | Sawyer, Jr. |
| 6,439,590 B1 | 8/2002 | Liang |
| 6,554,309 B2 | 4/2003 | Thir |
| 6,648,353 B1 | 11/2003 | Cabal |
| 6,648,355 B2 | 11/2003 | Ridenhour |
| 6,663,127 B2 | 12/2003 | Miller |
| 6,715,779 B2 | 4/2004 | Eschenbach |
| 6,716,141 B2 | 4/2004 | Bhoopathy |
| 6,769,706 B2 | 8/2004 | Chow |
| 7,011,323 B1 * | 3/2006 | Sayed ............ 280/261 |
| 7,293,789 B1 | 11/2007 | Efros |
| 7,300,065 B2 | 11/2007 | Tal |
| 7,306,249 B2 * | 12/2007 | Kwok et al. ........... 280/278 |
| 7,377,532 B2 | 5/2008 | Bauce |
| 7,497,453 B2 | 3/2009 | Fan |
| 7,584,978 B2 | 9/2009 | Pourias |
| 7,621,547 B1 * | 11/2009 | Fan ............ 280/221 |
| 7,669,869 B2 | 3/2010 | Meguerditchian |
| 7,784,808 B2 | 8/2010 | Fan |
| 2003/0025293 A1 | 2/2003 | Drew |
| 2005/0248117 A1 | 11/2005 | Hung |
| 2006/0066072 A1 | 3/2006 | Scarborough |
| 2006/0249925 A1 | 11/2006 | Yan |
| 2007/0235974 A1 | 10/2007 | Vargas |
| 2007/0290478 A1 * | 12/2007 | Ting ............ 280/260 |
| 2009/0134597 A1 | 5/2009 | Buchberger |
| 2009/0224506 A1 | 9/2009 | Sakirov |
| 2009/0315294 A1 | 12/2009 | Conti |
| 2010/0001487 A1 | 1/2010 | Pang |
| 2010/0219606 A1 * | 9/2010 | Padilla Orozco ............ 280/261 |
| 2011/0049830 A1 * | 3/2011 | Hung ............ 280/256 |

FOREIGN PATENT DOCUMENTS

| | | |
|---|---|---|
| CN | 201161687 | 12/2008 |
| CN | 201165310 | 12/2008 |
| CN | 201195586 | 2/2009 |
| CN | 101480987 | 7/2009 |
| DE | 4319104 | 12/1994 |
| DE | 29602729 | 6/1997 |
| DE | 10141416 | 3/2003 |
| DE | 10332133 | 7/2003 |
| DE | 10312878 | 10/2004 |
| DE | 102006027871 | 12/2007 |
| FR | 501552 | 4/1920 |
| FR | 2579950 | 10/1986 |
| GB | 189714126 | 5/1898 |
| GB | 333283 | 8/1930 |
| GB | 541014 | 11/1941 |
| GB | 2332403 | 6/1999 |
| GB | 2359285 | 8/2001 |
| GB | 2459485 | 4/2008 |
| JP | 63022294 | 2/1988 |
| JP | 01090688 | 6/1989 |
| JP | 10053186 | 2/1998 |
| JP | 2007008296 | 1/2007 |
| KR | 20070080633 | 8/2007 |
| WO | 8301764 | 5/1983 |
| WO | 9512516 | 5/1995 |
| WO | 9707861 | 3/1997 |
| WO | 0230732 | 4/2002 |
| WO | 2007126476 | 11/2007 |
| WO | 2008012861 | 1/2008 |
| WO | 2008023369 | 2/2008 |
| WO | 2008032969 | 3/2008 |
| WO | 2008101502 | 8/2008 |
| WO | 2009035278 | 3/2009 |
| WO | 2009136088 | 11/2009 |

* cited by examiner

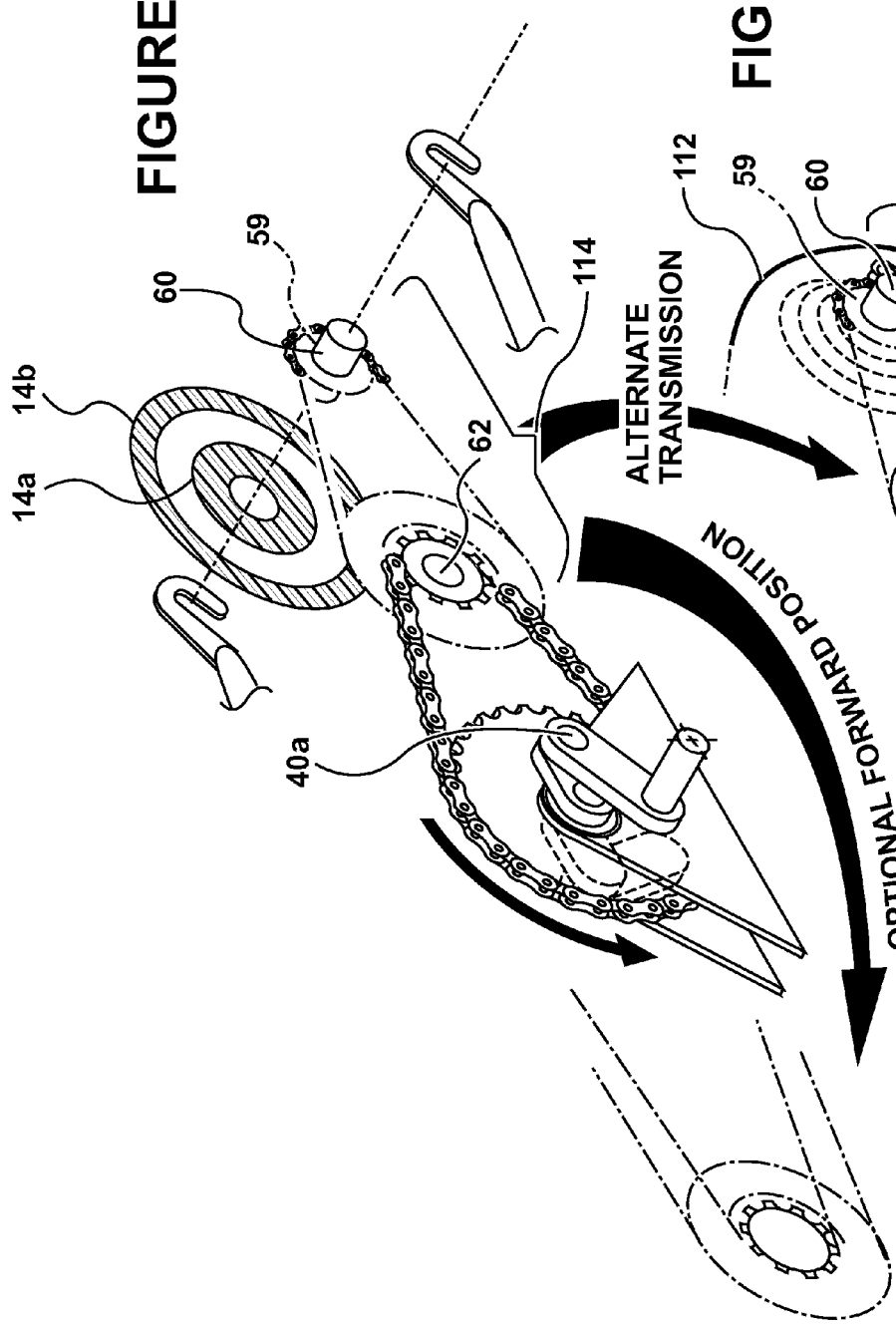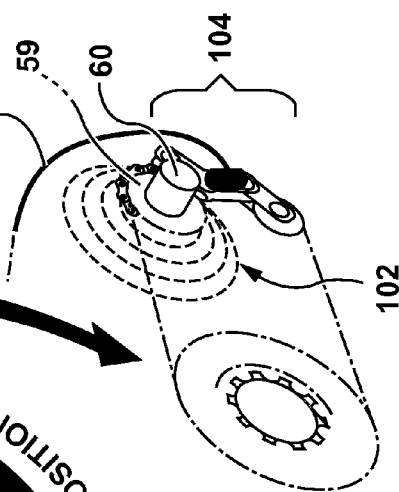

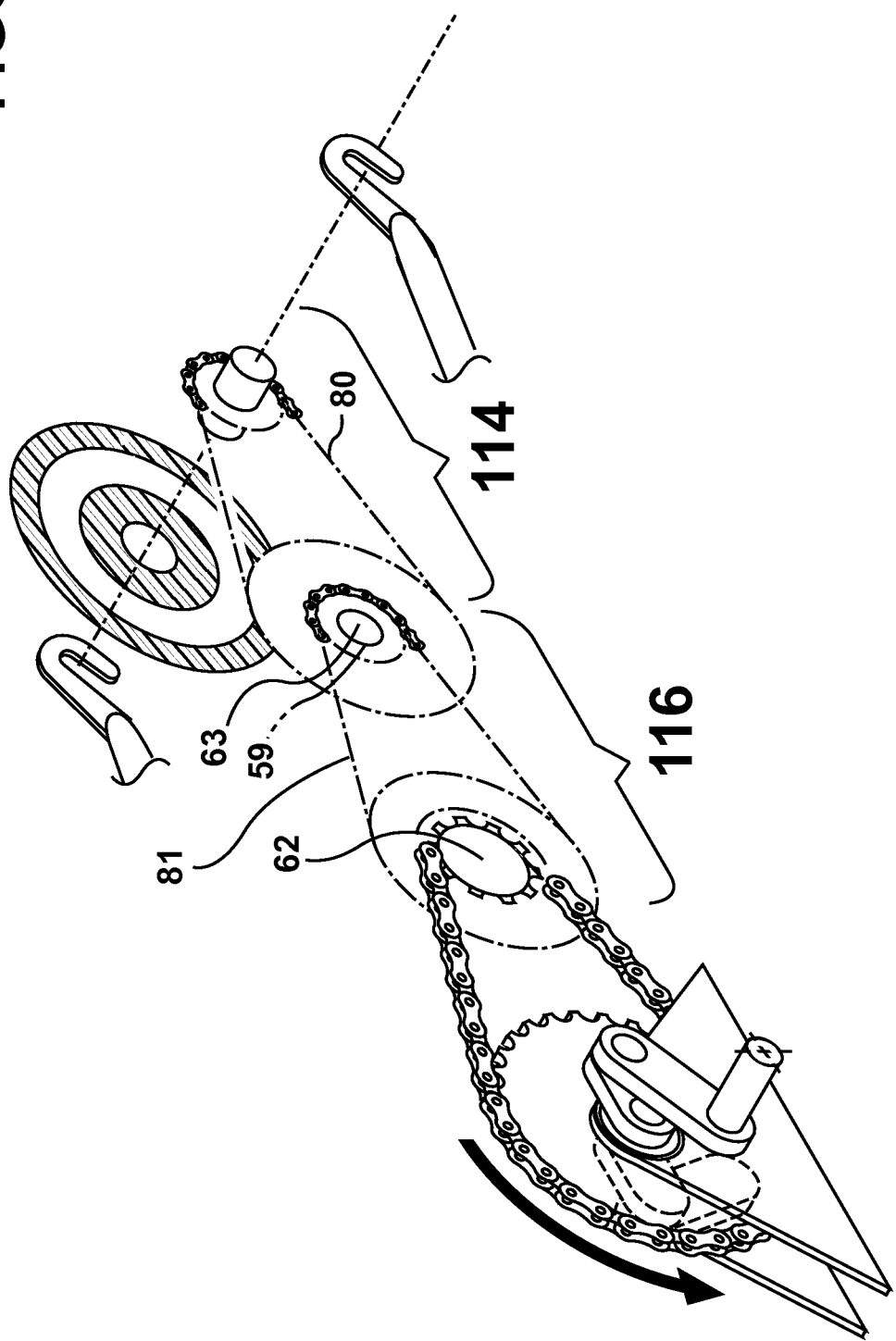

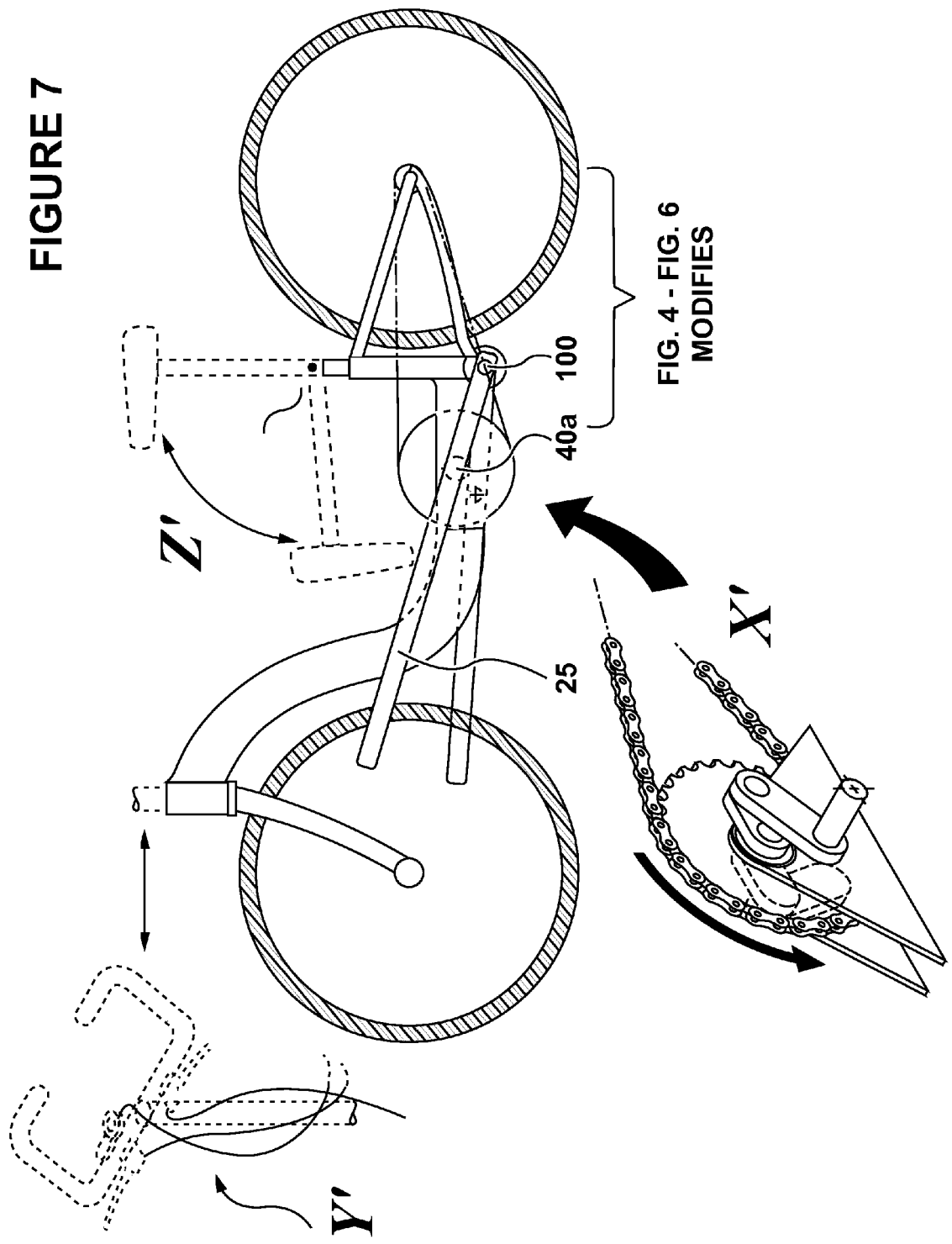

PEDAL-DRIVE SYSTEM FOR MANUALLY PROPELLING MULTI-WHEELED CYCLES

BACKGROUND

1. Field of the Invention

Multi-wheeled cycles, or what is commonly known as scooters on the market today typically comprise a platform supported on a front wheel that may be steered by a solid fixed or foldable handle bar, and a back wheel, some including a dual rear wheel axle. The user propels the scooter by simply pushing one foot on the pavement or ground, providing driving thrust. Smaller versions of this standard of recent have become quite popular. However, there are many scooters, even in the early 20th century, that have attempted to put pedal driving means with this above arrangement as a more convenient alternative to the foot thrust drive, and manually power the scooter, instead, by pedal motive force. This pedal driving scooter, vehicle, is the field of the particular invention.

2. Prior Art

Many structures for scooters have been invented that propel the scooter using various drive systems, for example U.S. Pat. No. 4,186,934 describes a scooter propulsion system having a ratchet drive. Even quite earlier were many attempts at devising a pedal drive means that uses a single ratchet wheel drive, such as in U.S. Pat. No. 1,750,187, combined with a slotted drive arm affixed to a tilting "see-saw" type main drive pedal. A ratchet drive can be found in U.S. Pat. No. 6,270,102 B1 that includes the unidirectional mechanism coupled with a gear train that links a chain and sprocket drive to the rear wheel.

Another clever ratchet mechanism uses reciprocating ratcheting rack gears on the end of pedal levers, as shown in U.S. Pat. No. 1,601,249. Another of this type, but more elaborate is found in U.S. Pat. No. 2,723,131; and still similarly in U.S. Pat. Nos. 4,124,222 and 6,857,648. A double pedal design is described in U.S. Pat. No. 1,440,372 that uses a sector gear drive and double wheel rear axle, as the present invention may also employ. A recent patent that uses a sector ratchet gear of similar structure and drive is in U.S. Pat. No. 6,688,624. The ratchet in U.S. Pat. No. 2,436,199 is actually within the sprocket gear itself. Still another version of the ratchet type drive uses cables or chains with drive sprockets or gears that often include a spring at one end to retract the chain or cable, after the pedal pulls it around the sprocket, thus "pulse-driving" the wheel. These types are found in U.S. Pat. Nos. 3,544,996 and 2,035,835. More recent versions of this type are disclosed in U.S. Pat. Nos. 4,379,566 and 7,044,488. Other early versions of this is found in U.S. Pat. No. 1,653,889 and also in the Bergen U.S. Pat. No. 2,118,640 and Whitehouse U.S. Pat. No. 3,175,844, which use the cable and/or chain plus ratchet combination drive, as does the more recent U.S. Pat. No. 5,192,089 with an even more elaborate mechanism depicted in U.S. Pat. No. 5,368,321 Some more recent patents have improved upon the cable and ratchet clutch mechanisms by using smaller and shorter multi-linkages to the one-way ratchet and add a back "kick-pedal" to pull out such cable and or chain driving, as in U.S. Pat. Nos. 3,992,029, 4,761,014, Design U.S. Pat. Nos. D582,991, 6,796,570, and 7,487,987, which uses a forward kick pedal and two wheels at the back of the scooter.

These above systems, including that in U.S. Pat. No. 6,716,141 which uses a chain and a cable and a spring, plus the one-way ratchet, all are dependent upon a uni-directional ratchet, or one-way drive mechanisms, which simply are an inefficient way to transfer motion to the drive wheel or wheels. These above discussed patents and several other ratchet type drive mechanisms similar to them do not and cannot drive the wheels in a continuous cycloidal-drive manner. Since, as the cable or chain is fully extended as the pedal drives downward, the cable is spooled out from its uni-directional drive motion on the wheel in a linear and not cycloidal motion, as would be in a linkage or crank bar type drive, as in the present invention. The disadvantage evident in these systems is an "over-running" of the pedal user's motion as he tries to catch up with the increased speed of the scooter from the previous stroke, with a new, now faster stroke, on the next downward stroke of the other pedal.

A good example that may illustrate this linear, rather than cycloidal drive motion, is the old trigger-squeeze toy spark guns—Once the trigger was squeezed to spin the fly wheel sparking stone to brush it against the flint inside at a high rate, then another squeeze at a normal speed trigger pull squeeze would not help contribute speed until the wheel slowed down enough to add another pulse of rotational or torque force that would catch up to the stone wheel actual speed again. So, the ratcheting trigger or the toy spark gun only provides a "pulse-type" motion drive, as would function similarly in the above scooters and cycles that use the ratchet type over-running clutches or one-way clutches or bearings. Then, at the end of the cable maximum extension point right when the cable is beginning to recoil on the ratchet take up spool and wheel, precisely at that point, there is a linear, sharp, non-cycloidal reverse as the recoil stage starts to put drive motion back in, but only at the point the speed of the driven wheel, creating in each cycle an initial "torque-less" point, this energy being wasted motion by the user's foot stroke down on the pedals, until the linear speed catches up with rotational motion of the driven wheel.

It is to be noted that the human body, in nearly all of the motion of its various members, arms and legs particularly, moves in a cycloidal (a continuous, rolling, rotary motion) motion, thus making the above described linear drive nature of the cable and chain recoil one-way clutch drives not as appealing to a cycle user. Even though the user of the present invention is primarily going linearly up and down on the pedals, the "timing" is still cycloidal as to continuous dive motion throughout the upward and downward pedal strokes. Hence, bicycles have never really been surpassed in their mechanical efficiency, since bicycle pedaling this cycloidal pedal motion that corresponds to and is conducive to the same human bodily kinematics natural design.

Still, other scooters or cycles use lever systems that drive rotational torque direct to the driven wheel, or the comprise intervening gear or sprocket and drive means, and instead use linkage drives to effect rotary motion to the wheels. U.S. Pat. No. 5,224,724 discloses a scooter having a simple harmonic drive that is driven by a single see-sawing type platform that is spring biased under its distal end. Linkage levers on one side of scooter connect directly to the back wheel and drive in a harmonic motion. The disadvantage of this drive arrangement, though it has minimal and low-cost drive structure, is that the back wheel's rotational momentum is necessary to stay continuous to keep the linkage from binding. In other words, the user must always be see-sawing up and down at all times the back wheel is rotating—There is no one-way ratchet in the back wheel, and if there were included one, it is believed the device could not function, as lever arms 44, and 34, respectively, would bind over the top dead center positions back wheel axle 36, as shown in FIG. 1, FIG. 4 and FIG. 5.

Another linkage arm drive system in a scooter is described in U.S. Pat. No. 1,558,851 in which a similar single arm see-sawing system, using a three bar linkage drives a sprocket and chain, further driving a sprocket on the back wheel. As in the '724 patent above, though, the back wheel's rotational momentum is necessary to stay continuous to keep the linkage from binding. U.S. Pat. No. 6,648,353 includes sliding pedals that roll at one end on adjustably inclined rails and are linked to lever arms at their opposite ends, said levers arms drive a similar sprocket and chain for the back wheel, as in the '851 patent. Likewise, US Pat. Application 2003/0025293 A1 reveals even a simpler direct drive linkage that also uses the similar sliding drive as the '353 patent, but uses pins in slots, on the reciprocating pedals. Another patent similar to the '851 patent also comprises a see-saw platform, but instead of using a sprocket and chain, uses a gear set to drive the back wheel. Again, it, as well as the '351 patent and '293 application has the same limitations as both of the above discussed patents, in that the back wheel cannot rotate independently of the of the see-sawing platform motion.

It is appropriate to discuss bicycle prior art, in that U.S. Pat. Nos. 4,574,649; 4,630,839; 4,666,173; 4,666,174; 4,227,712; 4,421,334; 3,759,543; 4,574,649; 5,335,927; 5,121,654 all use the type of one-way clutches and similar drive mechanisms discussed above, but on wheeled cycles with seats, that are basically bicycles. Again, like the above scooters that employ the same reciprocating chain and cable drive mechanisms, they have the same shortcomings. As to its uniqueness, U.S. Pat. No. 5,351,575 uses a pumping system that also employs the one-way clutches in a user-seated cycle. So, the present invention may use any sized wheels, in the range of scooters with three or four inch diameters to large diameters up to 27 inches or more and include a seat, also, therefore making the such art relevant.

Other relevant bicycle art is "large-wheeled" scooters and the frames for such, as are described and illustrated in U.S. Pat. Nos. 5,992,864 and 5,470,089, both structures having equal size front and back wheels, U.S. Pat. No. 5,899,474 having far smaller back wheel than front wheel.

A patent with a portion of its structure closer in form to the invention disclosed herein is found in U.S. Pat. No. 1,477,544, wherein a dual pedal drive is also articulated to a two bar linkage at each pedal that is used to drive a back wheel, or wheels, by means of a toothed member. However, it possesses a limited structure, and thus resulting limited function, because it lacks many critical mechanical advantages of the invention, including elements of safety, as discussed in the following, where the '544 Patent reads on line 52:

" . . . screwed to the underside of each of the pedal boards 9, 10. To the shaft 15 is also fixed the sprocket 20 . . . . "

By the above clear statement, the '544 patent is directly connecting to back-wheel drive sprocket to the back wheel drive shaft, with no intervening free-wheeling clutch, aka., one-way clutch, inside the hub. This is in direct contrast to such clutch having to be included in the present invention. It is moreover highly relevant that if the '544 patent included a one-way clutch in its wheel hub, instead of directly attaching the sprocket to the back wheel shaft, as it does [and the fact is that the inventor had prior art access to a clutch coaster (one way clutch or ratchet, or freewheel) wheel for cycles at least 12 years before, disclosed in the 1922 U.S. Pat. No. 959,509]. It is then argued that if the '544 Patent included a freewheeling rear wheel, as in the present invention, that upward and downward motions of the pedals would lock up as the pedals bottomed out on either side, and further, the "pedicycle's" drive links could even dangerously reverse direction, since they then would not be able to depend on the back wheel's momentum to keep them in cyclical motion, because the clutch would render the pedal motionless during pedal idling, and unable to advance the drive spindle/shaft because of over top center lock-down thereat, rendering the drive system inoperable, further explained in the following discussion. These are the same limitations that the U.S. Pat. No. 5,224,724 possesses, as discussed previously.

This serious shortcoming becomes readily apparent to one skilled in the present art, once considering '544's illustrations, that '544's linkage structure maintains the pivot or drive link located on the pedal arm directly above (exactly over top dead center) of the main drive sprocket spindle shaft. In doing so, a direct, necessarily continuous drive relationship, both backward and forward directions, is made permanently with the back wheel in order for the cycle to function. It is evident to one skilled in the art that the pedicyle requires the momentum of the back wheel to continually rotate together with the drive sprocket at all times so as to rotate the cranks 17 and links 19 around the drive sprocket, and this being further necessary in order to maintain the pedals' up and down cycle action. Thus, dependency on the momentum of back wheel and for maintaining continuous rotary motion between the wheel and sprocket is a serious limitation of the pedicycle, resulting in the inherent disadvantages and even dangers to the cycle rider.

Moreover, the inventor states: " . . . In this way any up and downward movement of the pedals 9, 10, is transformed in a continuous rotary movement of the rear wheel of the pedicycle."

In the present invention in its "free-wheeling" or one-way clutch/ratchet wheel, the clearest mechanical drive distinction and mechanical output, with respect to the '544 patent is made, since a user can and may indeed want to "ratchet or cycle" up and down one pedal of one side—while the other pedal side moved up and down without—making any continuous rotary driving motion to the wheel. This is important in reference to the present invention, for instance, because of a rider needing a high angle "lean-in" curving turn ratio and wanting to avoid spragging the low pedal side on the ground, or simply to exercise one leg, or even "ratchet-drive" by going up and down small linear distances on the pedals (not doing compete cycloidal cycles) to drive less aggressively as one would do "meandering" on bicycle pedals back and forth in the same manner. Thus, "some", even much, motion of the opposite, non-driving pedal motion could be effected with the present invention, as distinctively different than the '544 patent.

It is further clear to one skilled in the art, as regards patent 544, that the structure of the pedals are in exact synchronized opposite continuous motion-position, at all times, with no possibility or option for the cycle rider upon the pedals of having idling rest or non motion with respect to continuous rear wheel motion. In other words, the motion of the pedals can never be independent of the motion of the wheel. Also, due to this mechanical limitation, the cyclist has no stability to start the cycle going with one leg on a pedal and one leg pushing off the ground. If the user tries to push the cycle, he is forced to operate and negotiate the pedicycle's moving pedals, perhaps to the point of injury to the feet or shins, while the pedals are reciprocating up and down in motion at all times. Thus, the user is limited if wishing to push-with-foot and start scooter.

The user would obviously become stressed and fatigued by this unyielding, continuous pedal motion, even once upon and riding the cycle. This structural limitation is not only undesirable for purposes of stability and ease of starting, but as well as limiting the variety of experiences of safe, easy braking, jumping, wheelies, pitched turning and trick riding. The present invention offers a drive system and structure that offer various modifications to enhance the user's experience, and can employ many different kinds of brakes to stop the cycle safely, as well. However, the method of slowing or stopping the art of the '544 patent is plainly the action of the user's legs forcing downward and "retraining" the pedals' rapid reciprocating action—which could be truly hazardous to the rider, especially if traveling down a hill in which much momentum and speed has already been gained. It is reasonable to conclude from this fact that is the reason why no brakes are shown in the '544 structure and cycle system—because the cycle is slowed and stopped according to the above method.

Another disadvantage of the "544 patent is that there is no way to include a change of gear system, as would be, for example, the commonly employed sprocket and derailleur system prevalent in bicycles, since a structure that can support a freewheeling back wheel is not disclosed. Since the present invention's different linkage structure yet maintains a similar '544 pedals' pivot or drive pin located on the pedal arms it must be emphasized that such pivot, crank or drive pin is not directly above—but offset, (either in front of or behind, but not over top dead center) with respect to the main drive sprocket spindle shaft, unlike the '544 patent. Contrary to the '544 patent, the present invention does not require a direct, continuous drive relationship, in both backward and forward drive directions, with the back wheel, as does the '544 patent. However, in the present invention, when one pedal arm is all the way down, the opposite pedal's said crank pin is already beyond full up (beyond top dead center of the said drive spindle) position, thus ensuring continuous rotation of the drive system is sustained independently of the back drive wheel's continuous rotational momentum being necessary to keep the pedals from jamming or locking or reversing at the joints of the said first and second two-bar linkages. This is not true in the '544 patent.

Prior to 1922 (date of the '544 patent), freewheeling clutches for cycle wheels have been established, clearly demonstrating that the '544 patent had access to ratchet mechanisms for scooter back wheel hubs, if desired. However, the above discussion demonstrates that patent '544's drive structure does not, nor cannot, support a ratcheting or freewheeling back wheel, since, as mentioned, U.S. Pat. No. 959,509 fully discloses in 1910 an available, yet unutilized free wheel mechanism, therein called a "coaster wheel" used for bicycles and other cycles, over 12 years prior to the '544 patent art.

Further, as patent '544 positions his gear to the very back of the pedals, the potential for efficiency of torque is largely lost. In contrast, the present invention positions its pedal drive system far more forward to greatly enhance pedal drive leverage and thus torque, thereby increasing the potential for speed and superior efficiency of effort, while diminishing muscle fatigue. By the proximal positioning of the pedal drive system forward, closer to the pedal arm hinge point, and by the extension of the pedals, the present invention is also able to achieve a greatly enhanced range of up and down stroke, which in combination with its previously discussed improvement of torque yields appreciably increased power and speed, while being more efficient and causing far less fatigue per amount of realized momentum.

The location of the pedal drive system is paramount, and the forward position enables the most efficient use of gravity, without which much leverage is lost. As range of motion is increased in the upward and downward thrust of the pedals, it becomes desirable for the user to remain relatively flat for reasons of slippage, safety and comfort. Therefore, by raising the pedal arm angle, the user may benefit from the additional range of stroke, while, at the same time, decreasing the incline in the peak angle of the upward stroke, and likewise, the decline angle trough in the downward stroke. '544 patent limits its range of stroke, however, as the location of the pedals are positioned directly over the frame, and at the very distal end of the pedal, thus inhibiting stroke range, especially in respect to the downward position. Such a small range of motion is disadvantageous.

Finally, by the present invention moving the intermediate transmission forward, space is made available to accommodate a gear changing derailleur of which the prior art structure precludes the space to accomplish this. Other significant improvements can be seen in the following summary, such as efficient use of gravity/leverage, thrust, speed, decreased fatigue, increased comfort, control and safety, and trick uses, over prior art.

SUMMARY OF THE INVENTION

It is a primary object of the present invention to provide an improved pedal operated cycle or scooter structure that solves the inadequacies and disadvantages of the above prior art by providing a pedal-drive system for propelling multi-wheeled cycles with at least one front wheel and preferably only one back wheel, or optionally two back wheels. The invention includes a first pedal level arm, hinged at its proximal end, preferably near the front (as opposed to being optionally hinged at the back) of the cycle frame. In other words, the said proximal hinge would be forward positioned with respect to the front of the cycle frame and forward also with respect to a two-bar linkage system further described below. However, it may be more convenient, especially for more elderly cyclists to have the pedal arms' proximal pivot point (and thus drive mechanism or the above said two-bar linkage system) located opposite the front of the cycle, near the back portion or middle area of the frame, even behind a standing user, and the distal end near the front or forward section of the cycle frame or body. In other words, the said proximal hinge would be rearward positioned with respect to the front of the cycle frame and rearward positioned with respect to the said two-bar linkage system.

Either position, though this first pedal arm, between its proximal and distal end, is also drivingly attached by a crank pin thereat to a first two-bar linkage's first end, which first two-bar linkage is also drivingly attached at its own second end, to a first end of a common drive spindle, the spindle being perpendicularly positioned to the cycle frame axis. The second, opposite end of the drive spindle is likewise, drivingly attached to a second two-bar linkage's second end. The second two-bar linkage is also drivingly attached between the distal and proximal ends of a second pedal lever arm by a crank pin at the second two-bar linkage's first end. The second pedal arm's proximal end is also preferably hinged near the front (as opposed to being optionally hinged at the rear) of the cycle frame. These two bar linkages may also be called connector bars, or connector linkages, as well.

It is to be noted that both the said two-bar linkages have one inner connector linkage or aka., one inner crank bar each, and that both these inner connector bars are 180 degrees apart in their connector crank pin position relationship. However, both these inner bars could be eliminated and a disc be used instead that has connector crank pins affixed, one on each side and equidistant from its spindle center at the same distance as in the connector crank pins in the two bar linkage are positioned. Moreover, this same substitute output disc could have sprocket teeth or gear, or pulley teeth on its periphery, thus allowing for the said inner links to be eliminated and the disc take their place as an inner crank member, itself with two outer crank bars, called above second linkage arms, or output arms, output bars. It is, however, more convenient to have the extra two inner cranks or inner bars in the preferred embodiment, instead of the above said disc, because of the facilitation of bearing support brackets to fix the spindle and toothed member in a secure and reliable drive structure.

The said pedal arms and the first and second said two-bar linkages are uniquely configured so as to rotate and drive the said drive spindle about its rotational axis per each pedal's downward stroke, so that when one pedal arm is all the way down, the opposite pedal's said crank pin is already beyond full up (beyond top dead center of the said drive spindle) position, thus ensuring continuous rotation of the drive system is sustained independently of the back drive wheel's continuous rotational momentum being necessary to keep the pedals from jamming or locking or reversing at the joints of the said first and second two-bar linkages.

While it is possible to describe the invention's drive system's pedal arms, namely the first and second pedal arms as third drive input bars, in what would then be a three-bar linkage on each side of the input disc or toothed driven output member, it preferable to describe the invention from the standpoint of a dual two-bar linkage system with a set of pedal arms. The pedal arms may consist of a platform which support the pedaling feet of a user, whether standing, pedaling or sitting, pedaling. A support member, such as a rod, tube or arm may uphold underneath a pedal platform, attached thereto, but it is obvious that the pedal platform and support member can be one single integral elongate piece of support material that a user can stand upon. A user could simply just stand on the support member itself, and not even need any platform or side extension to support themselves. In addition, it is possible that the support arm may have side support arms of any material that are lightweight and preferably tubular and that are sufficiently strong material, either integrally affixed to the support arms, as in a weldment or molded, such as a tube section. These side extensions could jut outward, generally perpendicular to the axis of the support member, and the user could stand on these directly, instead of needing to stand upon a platform affixed thereon. Moreover, these extensions could be in the form a small side shaft and rotatable pedal, or as an extension that could rotatably support a shaft that rotatably supports a pedal, similar to that on a bicycle.

The said drive spindle is further described as a stationary pivot location, as is the proximal hinge points of the pedals, a stationary pivot location. It is critical to understand that the distance between these two stationary pivot locations must be either longer or shorter than the distance between the said proximal hinge point and the pedal arm crank pin. If such distance were longer, then the output sprocket would turn in one direction, and if shorter, then the output sprocket would turn in the opposite direction More importantly, if as discussed above, either of the said shorter or longer stationary pivots' distance were the same distance as that distance between the said proximal hinge point and the pedal arm crank pin, then the mechanism would lock down due to the said over top dead center position discussed previously, unless, as in the '544 patent, the back drive sprocket on the back wheel were directly fixed to the wheel hub drive shaft, and then the momentum of the back wheel would keep the two-bar linkages from binding or reversing. This seemingly small, critical structural distinctive is why the present invention is not limited to depending on the momentum of the back drive wheel, and may instead utilize a driven wheel with a freewheel, and therefore effect major advantages discussed above and following, over the '544 patent's structure.

Furthermore, since the said crank pins on the inner bar, or said disc, remain 180 degrees apart around the said spindle or output shaft, both the said second bar linkages will have differing angular relationships to the said respective inner crank arms. As well, at the end-of-stroke positions of the said pedal arms (one up and the other down) the inner crank arms are having different angular relationships with respect to the said outer crank arms, also. And finally, one or the other input bar can always apply rotating force to the said output disc or said output crank arms, which is not true in the '544 patent, unless as it does not, the sprocket has no overrunning clutch or free wheeling ability, and the rotational momentum of the wheel drives the over-the-top-dead-center linkages beyond their lock-down, over-center positions, occurring each stoke of the pedal at "end-of-stroke" positions.

The drive spindle further includes a driven, toothed member, such as a toothed pulley, or a sprocket that may directly drive a flexible transmission element, such as a toothed belt, or chain, that may in turn drive a sprocket, or another toothed member on a preferably back wheel or back wheels of a cycle. The toothed member may also instead be a gear that drives another gear or geared shaft that may transmit rotational motion to the said preferably back wheel or wheels, a driven gear thereon. Moreover, even a pulley with a belt can be used to transmit rotary motion to another pulley, either on the back wheel hub, or connecting to an intermediary transmission.

To gain higher speed, a second mechanical speed-increasing transmission of any type, sprocket and chain, or gear train, gear-set, or any other transmission means, may intervene the said spindle's and toothed member's direct drive to the wheel and step up the final gearing ratio at the driven wheel. For example, a typical multi-sprocket-cone and speed changing chain-derailleur, commonly used on sprocketed bicycle drives may be incorporated anywhere along and within the described transmission of the pedal drive system. As well, a standard, multi-speed (typically, three speeds) internal gear train hub can be incorporated anywhere within the drive system, though preferably within a back driven-wheel hub, and alter speed and torque on the driven wheel in conjunction with the main pedal drive system.

In another embodiment the drive mechanism may include even a third "step-up" intervening transmission before drivingly connecting to the back wheel. The pedal drive system can be used for all small, medium and large manually powered cycle-vehicles, particularly for both scooters and bicycles, and may also include an electric motor and battery, commonly prevalent in the scooter industry, to assist in the drive propulsion.

It may be mechanically advantageous to include a free-wheeling mechanism not only in the back wheel or back wheels hub, but even in any of the hubs or on the drive or driven shafts of the said intervening transmissions, because of manufacturing and assembly cost reduction and ease of repair or part replacement. For example, it is known that a standard #41 bicycle chain or a similar torque load-carrying capacity #35 industrial chain can be used on the main drive spindle's sprocket, however, if one uses one or even two intervening transmissions, such as another sprocket and chain "step-up" the speed would be higher on that end drive sprocket (for e.g., at the driven wheel), but the torque would not be that great and a lighter #25 chain and #25 sprocket could be used, minimizing weight and cost to produce the said pedal drive system.

Some further objectives and advantages of the invention are that the pedal drive system offers the user the ability to first initialize motion by the safe and simple effort of pushing off with either foot while securely positioning the other foot in a stationary fashion on the appropriate pedal without the pedals constantly moving and so forcing the foot into a precarious stance. Prior art of U.S. Pat. No. 1,477,544 limited itself in this manner as clearly stated "In this way any up and downward movement of the pedals 9, 10 is transformed in a continuous rotary movement of the rear wheel of the "pedicycle." This is important to note, as the prior art scooter forces the user to negotiate a constant up and down motion of the drive pedals, if the cycle were simply "walked forward", or backward, as well, with the foot positioned on the pedal. This start action is much more stable, thus safer, as well as being easier to perform and so minimizes fatigue and maximizes efficiency in the present invention, because its structure allows the user no rest position throughout the entire scooter driving experience and creates serious fatigue, injury and danger issues. Once in motion, though, the '544 structure user becomes more tiresome, for the user has no option or ability to "coast" or be in a forward motion with the feet being in a resting position.

Another objective is to enable the user to have the option of "trick", stunt, or varied riding styles such as riding or being in the resting position while performing a "wheelie" with the front tire up in the air while the back tire remains on the ground. The user could also perform jumps and maneuvers with both tires off the ground. To further the performance of jumps, the present invention may incorporate shock absorbing bushings to allow for downward weight or force exerted on the pedals as the user executes a jump. Wheels in various sizes and constructed from a variety of materials including urethane, solid rubber or pneumatic tires may be used to further enhance the user's ability and options to perform "wheelies." The foot peddle may be angled in the back end area for better control in a wheelie use, as well.

The present invention may integrate a folding, telescoping steering column—to maintain wheelies, or offer various riding experiences in steering response such as ability to use bars to pull body weight downward so muscle force use may increase torque. The structure offers various handle positions for the arms as the feet are moved up forward or backward on pedals with appropriate positioning of steering forward or backward for optimum efficiency, stability and comfort. Fatigue is minimized and proper back posture is enhanced. With these handle options, the user is forced to assume and hold a back posture which relieves undue strain on the lower back, and avoids leaning forward in a prolonged slightly bent position.

The present invention may also integrate a folding and telescoping bike seat. This will provide the user with a backward incline (toward the rear tire) to distribute weight to the back of the scooter or cycle. This, in combination with the positioning of the adjustable handle bars in a similar backward position, will enable a shifting of weight to the rear so as to enhance the ability, ease and balance preferred to better accomplish and continue in a relaxed, or fast driving stance, or the wheelie stance. The folding and telescoping option for both the steering arms and the seat will also offer a compact way to carry or store the scooter or cycle.

The above summary is general and serves as an overview of the invention. Further features and modifications besides those summarized above will be described in the following description. It should be obvious to one skilled in the present art to see possible general or specific modifications that may be substituted for those employed to achieve the purposes of the present invention, while not departing from the scope or spirit of the present invention.

BRIEF DESCRIPTION OF THE DRAWINGS

FIG. 4 is perspective view of a modification of the invention wherein an additional speed increasing transmission may be combined to increase the speed ratio output of the drive system.

FIG. 5 illustrates the said intervening transmission of FIG. 4 which may further comprise a multi-sprocket-cone speed changing derailleur.

FIG. 6 is a perspective view of another modification of the invention wherein two additional speed increasing transmissions may be combined to increase the speed ratio output of the drive system.

FIG. 7 is a side view of the invention wherein components in X' are optionally adaptable to a larger-wheel version of the pedal drive system that further has the distal ends of the pedals pointing toward the front end of the cycle frame.

DETAILED DESCRIPTION OF THE PREFERRED EMBODIMENT

Figure 1:
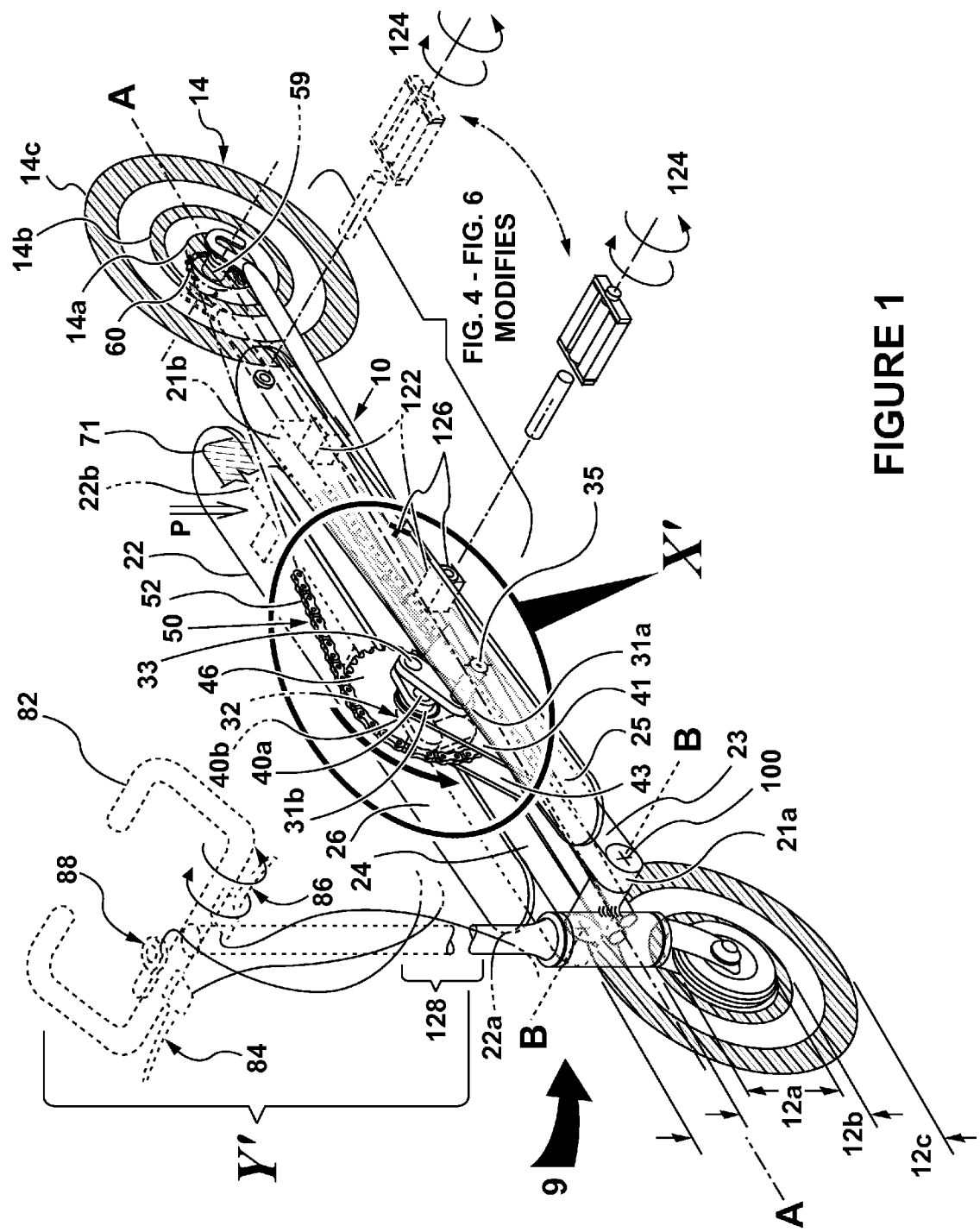
FIG. 1 is a perspective view of the subject pedal drive system in smaller optional wheel versions, including component scope point X' encompassing the main linkage drive components of the system.

In describing the preferred embodiments illustrated in the drawings and summarized above, specific terminology shall be resorted to for sake of clarity. However, it is not intended to be limited to the specific terms so selected and it is to be understood that each specific term includes all technical equivalents which operate in a similar manner to accomplish a similar purpose.

Figure 2:
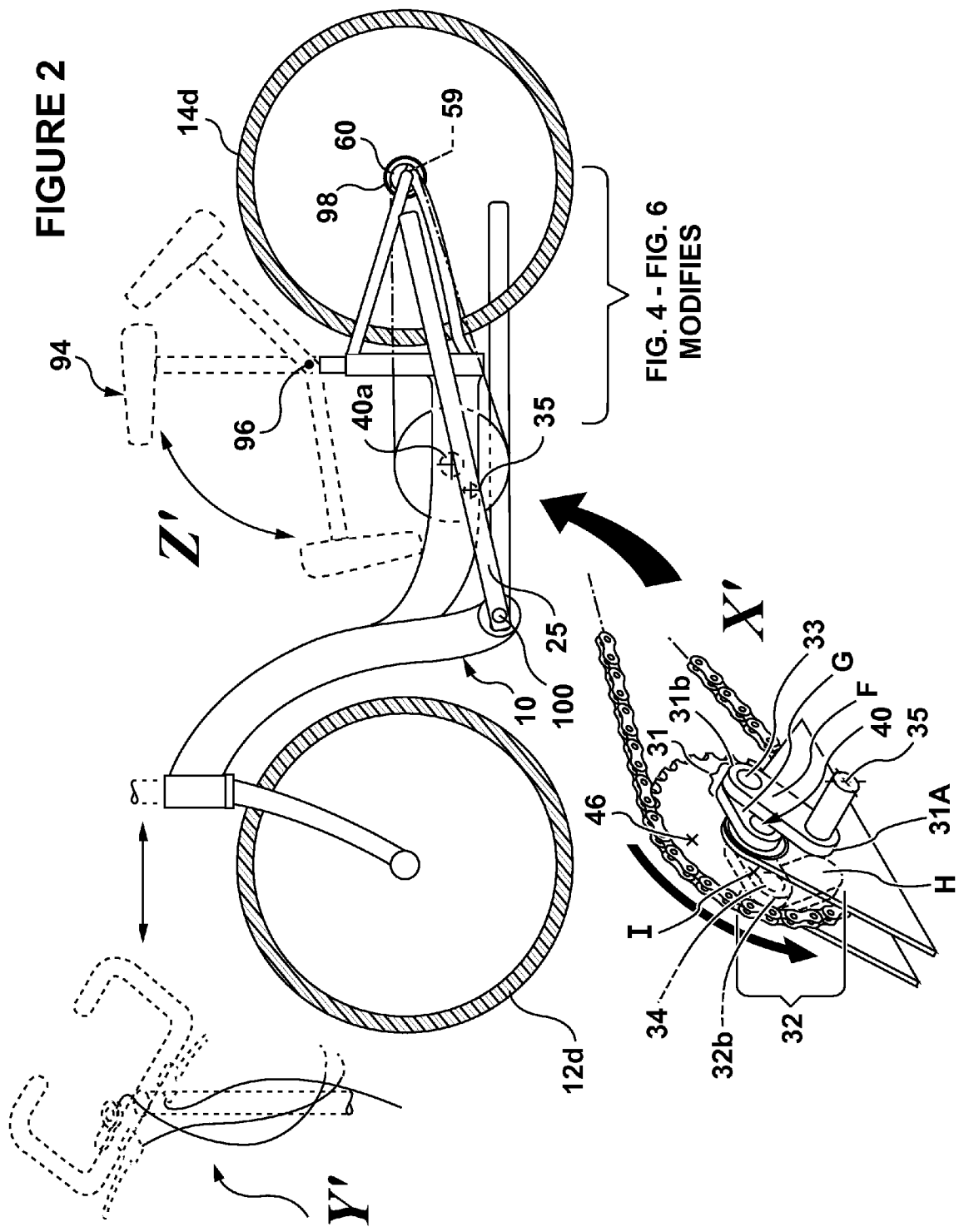
FIG. 2 depicts the pedal drive system components in X' as optionally adaptable to a larger-wheel version of the pedal drive system.

Noting FIG. 1 through FIG. 12, particularly FIG. 1 and FIG. 2, a pedal drive system 9 for propelling a multi-wheeled cycle is disclosed, comprising a handle assembly Y' including a handle bar 82, possible handle hinge area 128 whereat or where near the area a hinge may be included, a first brake assembly 84, a second brake assembly 86 and a gear switch assembly 88. Note said drive system 9 having a hingable seat assembly Z' including a seat 94, and a seat extension hinge 96. The said pedal drive system 9 further has a cycle frame 10 having frame axis A-A and proximal hinge axis B-B near the steerable front wheel 12 that encompasses optional wheel relative sizes 12a through 12d, while near the back end of the said frame 10 there is at least one driven wheel 14 size relative range 14a through 14d. The said frame 10 supports first pedal arm 21 having proximal hinge end 21a and distal end 21b and second 22 pedal arm, having proximal hinge end 22a and distal end 22b. It is to be noted that at these said proximal hinge ends 21a, 22a, respectively, that there may be additionally included a resilient or elastomeric bushing or support cup or pad (not shown) in or around support member hinge 100 that could sufficiently sustain shock and stress loads occurring when a user lands on the ground after a jump or drop-off area and the user's weight forces down upon the said pedal arms 21, 22.

A first support member 23 and a second support member 24 can suffice for a user to step upon and ride said pedal drive system, but may include further a first and second platform, 25, 26, respectively attached thereon, and wherein each said support member is hingably supported by said cycle frame 10 at their proximal end at said support arm hinge 100. Said first and second pedal arms may include a chain guard 71 that can be simply a vertical lip edge along said pedal arms 21, 22, respectively or along said first and second support members 23, 24, respectively, as well.

It may be beneficial to include an optional rotatable pedal 124, in a pedal bushing 126 rotatably supported in side support member 122, or anywhere along or at the back of said pedal arms, 21, 22 able to be inserted at various selectable positions along the length of said pedal arm into any said pedal bushing 126 points made therein. This said pedal 124 could be wide or long and narrow in shape and allow greater flexibility in allowing the user to shift the thrusting of their legs at many more angles other than those achievable on the said pedal arms, 21, 22.

Noting also component scope point X' encompassing the main linkage drive components of the system, said pedal drive system 9 also comprises a first two-bar linkage 31 that has a first end 31*a* and a second end 31*b* and further comprises an inner bar G and an outer bar F, as well as a connector crank pin 33 and a pedal crank pin 35 aka., a drive pin; a second two-bar linkage 32 that has a first end 32*a* and a second end 32*b* and further comprises an inner bar I and an outer bar H, as well as a connector crank pin 34 and a pedal crank pin 36 aka., a drive pin that is, with the other said drive pin 35 are both located between the said distal and said proximal ends of each the said pedal arms, 22, 21, respectively.

Said inner bar G and I have fixed thereon said connector crank pins, 33, 34, respectively and these connector crank pins 33, 34 remain in a fixed 180 degree relationship with respect to each around a drive spindle 40. It is to be noted that both said outer bar linkages, F, H, respectively, have differing angular relationships with respect to the said respective pedal arms, 21, 22, at said first and second pedals' end of stroke positions, that is, at the point when one pedal is fully depressed on one side and the opposite pedal is fully up on the other side of the said cycle frame 10.

Said pedal drive system's 9 said drive spindle 40 is supported at a left support bracket 41 and a right support bracket 43 thereon said cycle frame 10 between said first and second pedal arms, 21, 22. Said drive spindle 40 further comprises a first end 40*a* and a second end 40*b*, as well as a toothed member 44 for transmitting a driving force to said at least one rear wheel 14, using a flexible transmission element 50 and a rear wheel toothed member 60 and free wheeling clutch mechanism 59 that cannot only be added to the said at least one rear wheel 14, but can also instead be included in either the second added transmission 116 hub 62 or third added transmission 114 hub 63 enabling the same advantages discussed throughout. In other words, the said 59 free wheeling clutch, or one way clutch mechanism or a uni-directional bearing, can be placed in any of the pedal drive system's said additional intervening speed increasing transmissions to enable the said back wheel 14 to free wheel spin.

Noting FIG. 5, it may be useful for either the said second added transmission 116 or said third added transmission 114 be further comprised of a sprocket derailleur mechanism 104, commonly known in bicycles, further comprising a sprocket cone cassette 102 and derailleur cable 112 so that various speeds and torques can be easily achieved, as in a bicycle. A further feature is that a multi-speed gearing hub 98 as noted in FIG. 2, can be included, as well, anywhere along the driven said single or multiple transmissions discussed above, wherever the said freewheel mechanism 59 can be, thus adding the desirable effect of speed and torque changing without the need for the said derailleur system 104 to do so.

It is further noted, particularly in FIG. 4 through FIG. 6, that a standard number-41 bicycle chain or a similar torque load-carrying capacity number-35 industrial chain can be used on the said main (heavier torque) drive spindle's 40 said sprocket 46 and wherein either of the said intervening speed step up transmission's 116, 114, respectively, third chain 80 and second chain 81, that connects to the said free wheel sprocket hub 59 may conveniently be only a lighter, smaller weight, number-25 chain and wherein the at least one said back wheel's 14 said sprocket 60 may be a number-25 sprocket.

Figure 10:
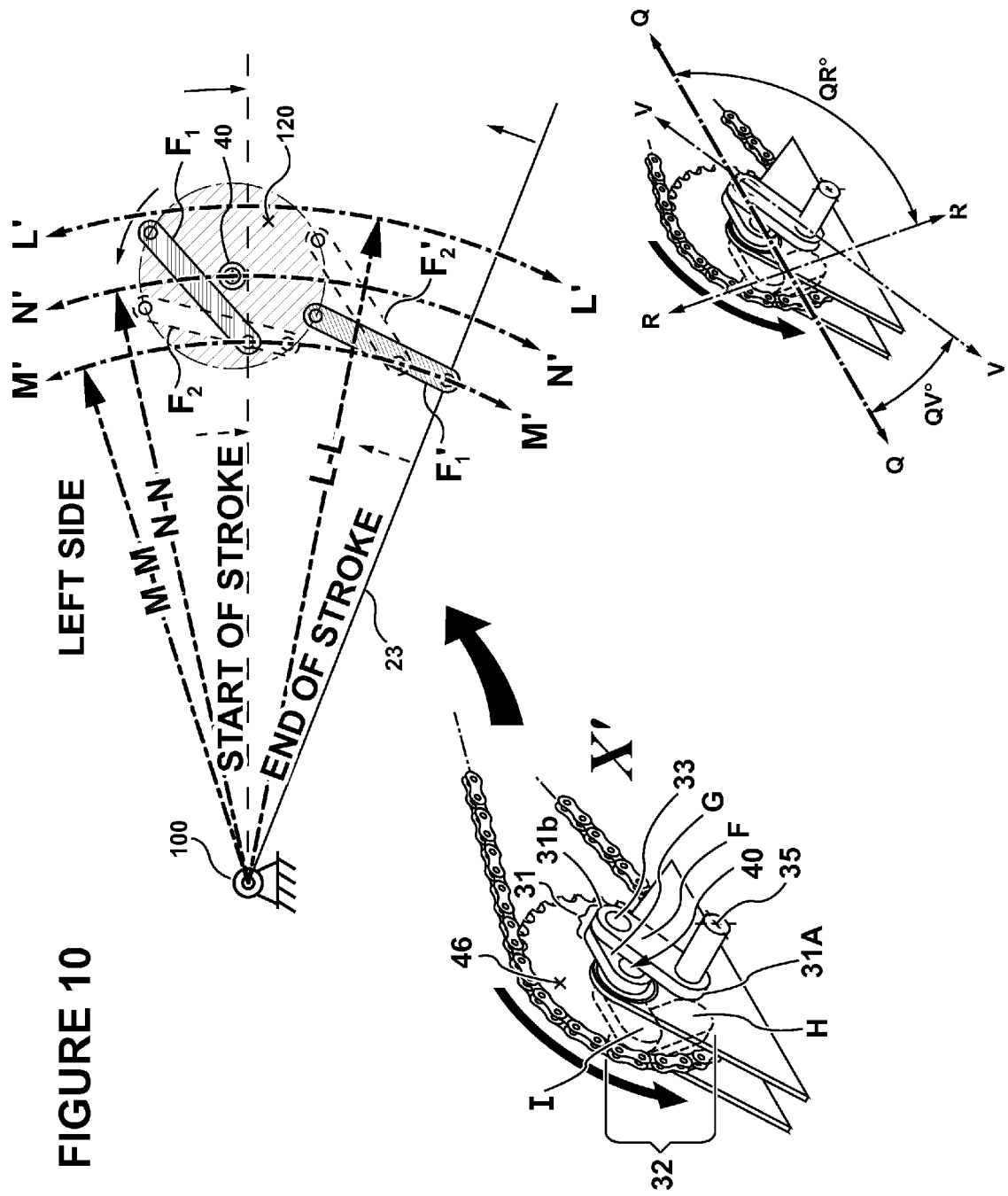
FIG. 10 is both flat and perspective views of the critical angular relationship of the two-part linkages with respect to the pedal arms and their respective proximal fixed hinge point and drive or pedal crank pin as relates to the drive spindle of the pedal drive system.

Noting FIG. 10, especially, the said drive spindle 40 in the center of output disc 120 is further described as a stationary pivot location, as is the said proximal hinge points the proximal hinge pedals, 21*a* and 22*a*, respectively, a stationary pivot support member hinge location 100. It is critical to understand that the distance between these said two stationary pivot locations must be either longer, shown by radius distance line L-L with corresponding radial section L'-L', or shorter, shown by radius distance line M-M, with corresponding radial section M'-M' than the distance between the said proximal hinge points, 21*a*, and 22*a*, respectively, and the said pedal crank pins, 35, 36, respectively, shown by radius distance line N-N and radial section N' N'. If such distance were longer, then the said output toothed member 44 would turn in one direction, and if shorter, then the said output toothed output member 44 would turn in the opposite direction.

More importantly, if as discussed above, either of the said shorter or longer said stationary pivots' distance were the same, as they would be if they had the said line radial axis of N-N, then the mechanism would lock down, due to the said over top dead center position discussed previously, unless, as in the '544 patent, wherein the back drive sprocket described on its back wheel were directly fixed to the wheel hub drive shaft, and then the momentum of the back wheel would keep the "544 patent's "over-the-center" two-bar linkages from binding or reversing, as is the case with the '544 patent. This seemingly small, structural distinctive is critical and is precisely why the present invention is not limited to depending on the momentum of the back drive wheel, and may instead utilize a driven wheel with a said freewheel toothed member 60, and therefore effect the major advantages discussed in the description and summary above and following, over the '544 patent's structure.

Figure 9:
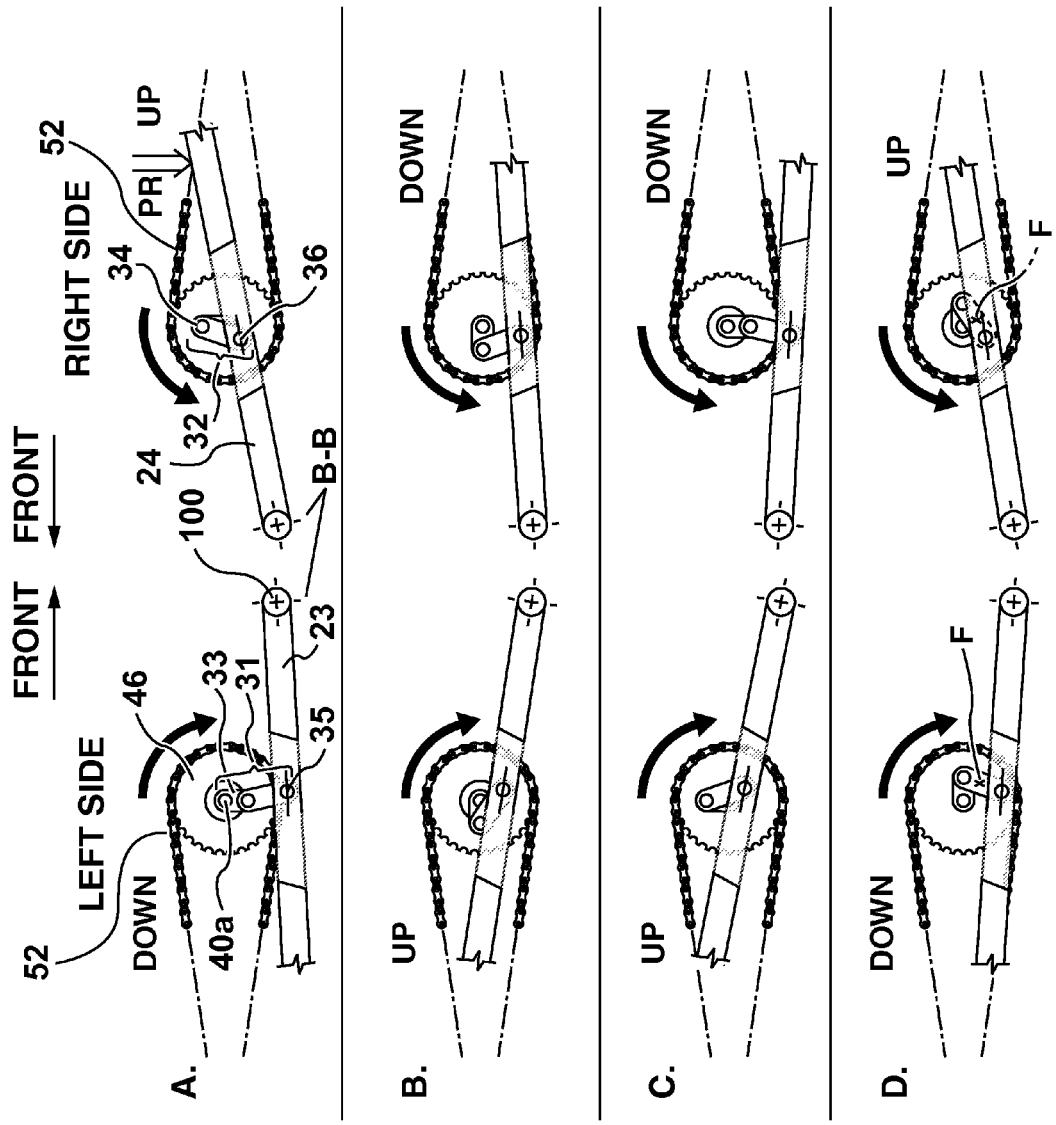
FIG. 9 is a sequential view of the pedal drive system components depicting the relationship of the system's linkages through various stages of pedal positions.

Furthermore, this angular relation involves not only the above said L-L, M-M and N-N radius lines and their respective said radial sections, but noting again FIG. 10, intersecting axes Q-Q, V-V and R-R, which form angles QV and QR, wherein said each connector crank pin 33. 34, respectively, remains 180 degrees apart around the said drive spindle, and wherein both said outer bar linkages, F, H, respectively, have differing angular relationships with respect to the said respective pedal arms not only in mid-position stroke of the said pedals, as clearly seen in FIG. 10, but, now noting FIG. 9, at said first and second pedals' end of stroke positions, clearly seen in section FIGS. 9A and 9C respectively. In FIG. 10, the distance between the pedal crank pins 35, 36 and the proximal ends 21a, 22a of the pedal arms 23, 24 is either longer by a radius distance line L-L or shorter by radius distance line M-M relative to a radial line distance N-N between the drive spindle 40 axis and the proximal ends 100, but not the same as N-N to avoid lock-down at end of stroke positions, and wherein such pivot crank or drive pin is not directly aligned, but offset either in front of or behind, but not over or aligned with the drive spindle at each end stroke of the pedal at the end of stroke positions. As shown, none of the pedal crank pins 35, 36 or the connector crank pins 33, 34 lie in alignment, but are offset relative to the top dead center passing through the drive spindle axis at either to or bottom end strokes. Each connector crank pin 33, 34 remains 180 degrees apart around the said drive spindle 40 and are offset either in front of or behind, but not over or aligned with top center with respect to the drive spindle axis at end of stroke positions.

Another element that may help clarify the distinctiveness of the said pedal drive system 9 is that one or the other said first and second pedal arms 21, 22 can always apply rotating force to the said inner bars' crank pins G, I, respectively, without the necessity of rotational force being returned back to the said inner bars' crank pins by means of the rotation of the said driven wheel 14.

Figure 3:
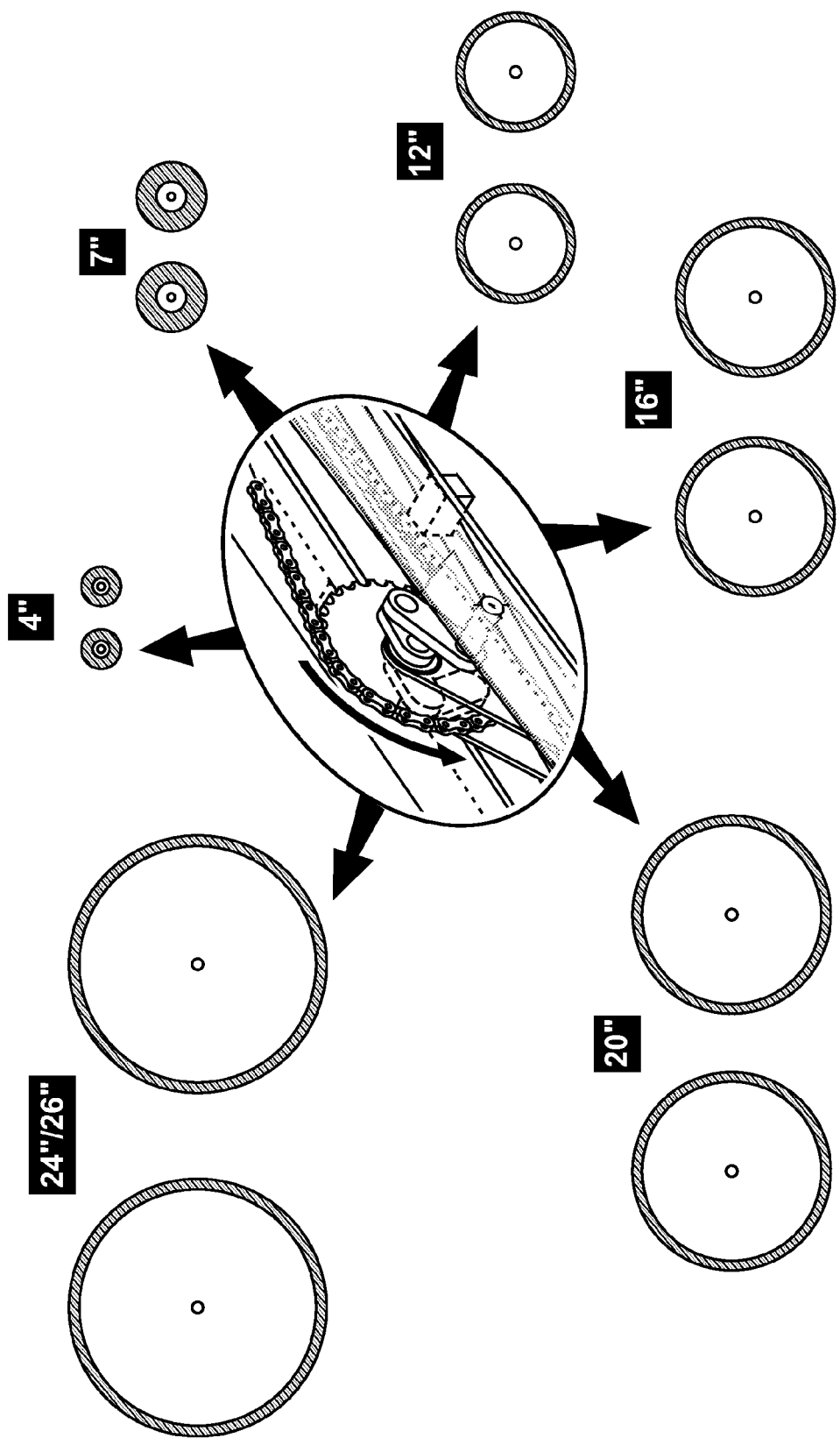
FIG. 3 is an application-based perspective of what range of size wheels for which the present invention, with drive components encompassed in X' can be used.

FIG. 3 simply illustrates, by means a 4", 7", 12", 16", 20" and 24" or 26" wheel pair diameters, in any range of materials or hub structures, preferably in a polymer or pneumatic tire, what range of size wheels for which the present invention, with drive components encompassed in X'. can be used.

Figure 11:
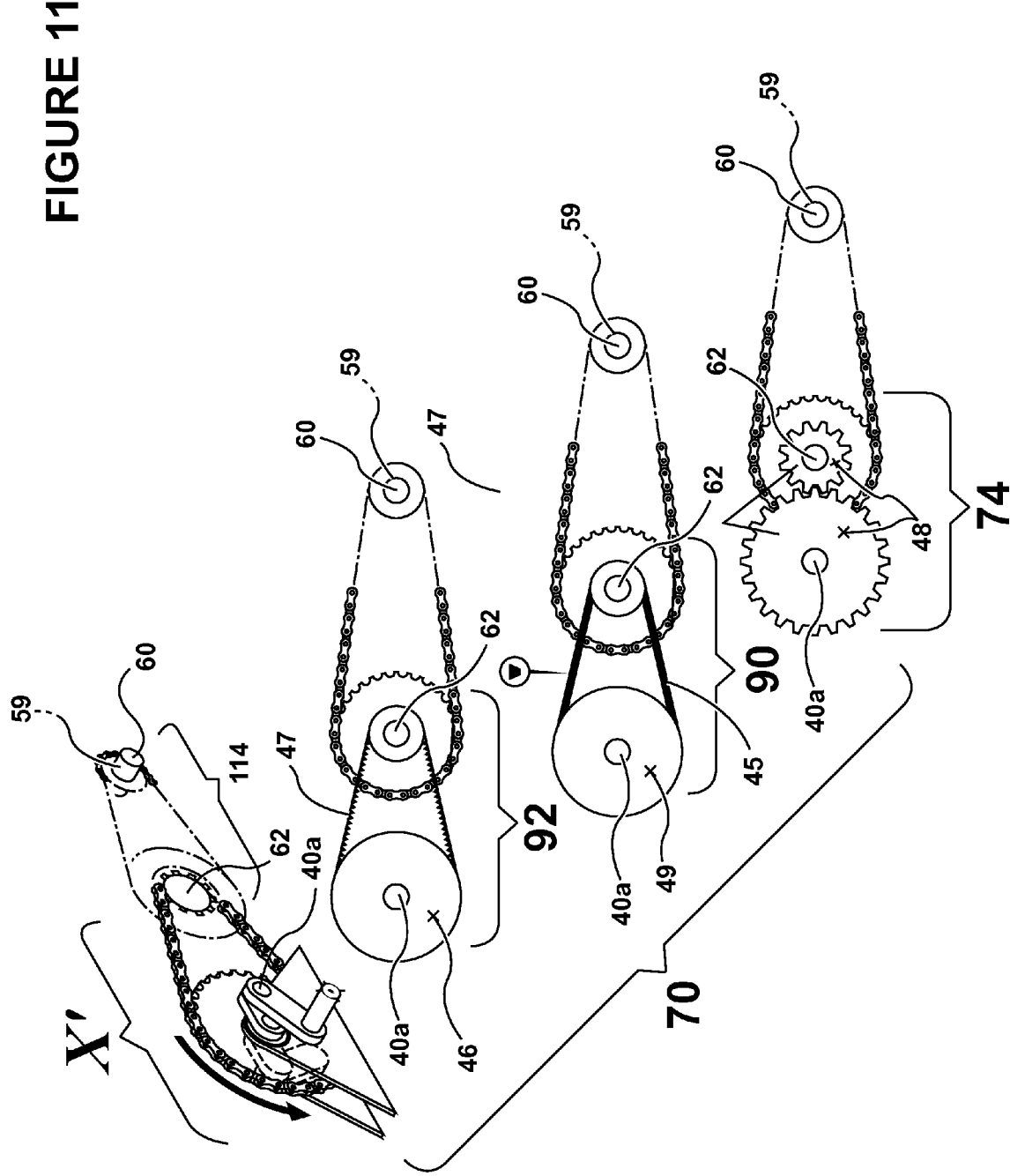
FIG. 11 is a side view of the drive components illustrated in FIG. 4 depicting several optional transmissions that may be used to drive the main drive spindle.

FIG. 11 illustrates the optional drive assemblies 70 wherein said drive member's said toothed member is a toothed pulley assembly 92 with toothed pulley 46 and said flexible drive member is a toothed belt 47; secondly, wherein said drive member's said toothed member is a belt pulley assembly 90 with pulley wheel 49 and said flexible drive member is a pulley belt 45; thirdly, wherein said drive member's said toothed member is a gear assembly 74 with gears or geared shaft 48, all of which assemblies are different mechanisms whereby the pedal drive system can be modified to operate in the same manner and produce the said above advantages.

Figure 8:
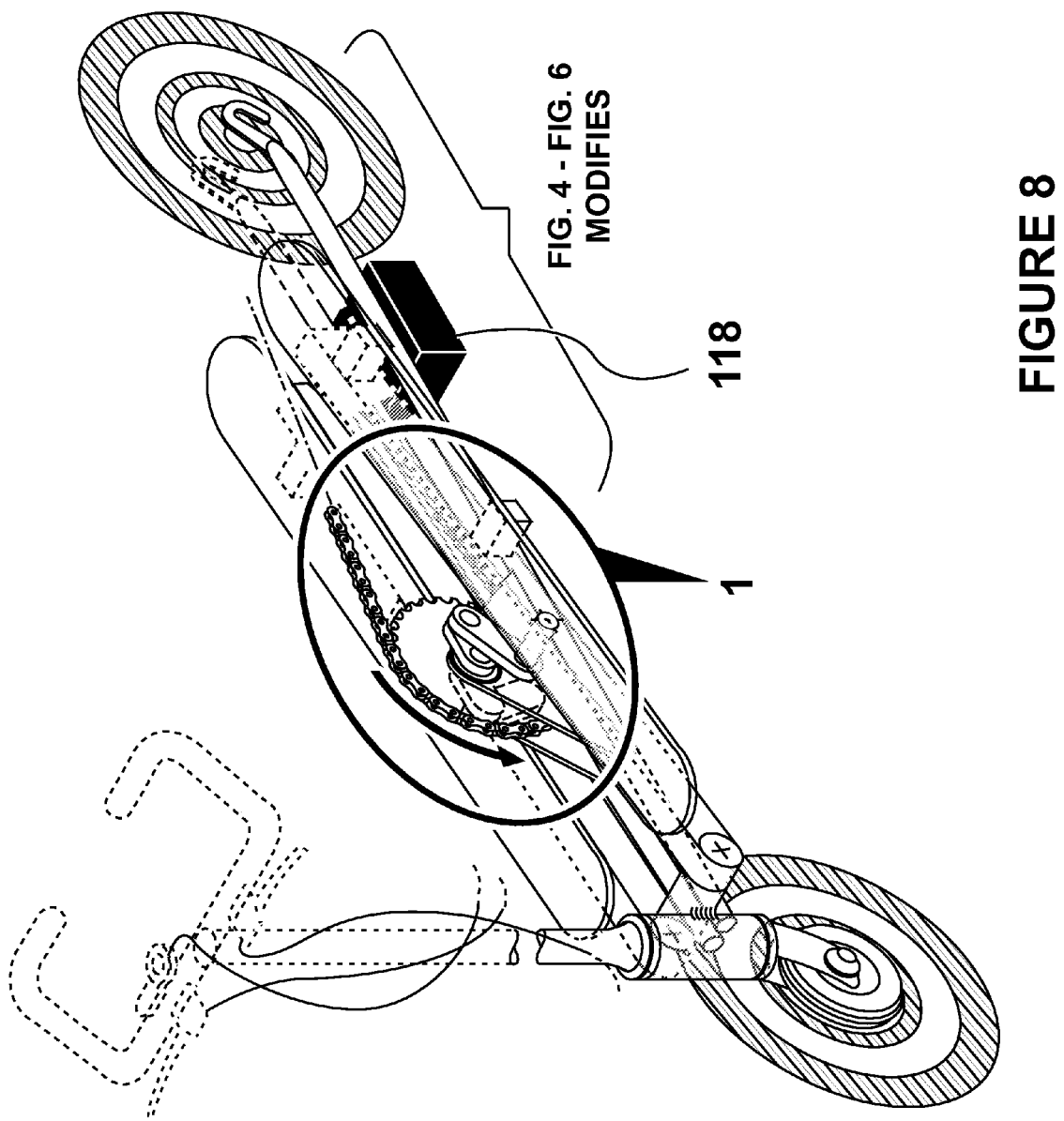
FIG. 8 is a perspective view of that drive system of FIG. 1 but further comprising an auxiliary electric motor affixed to the cycle frame and drivingly engagable to the sprocket chain.

FIG. 8 shows the said pedal drive system 9 of FIG. 1, wherein the said sprocket chain has connected thereat an auxiliary electric motor 118 affixed to said cycle frame 10 and drivingly engagable to said flexible transmission element 50.

Figure 12:
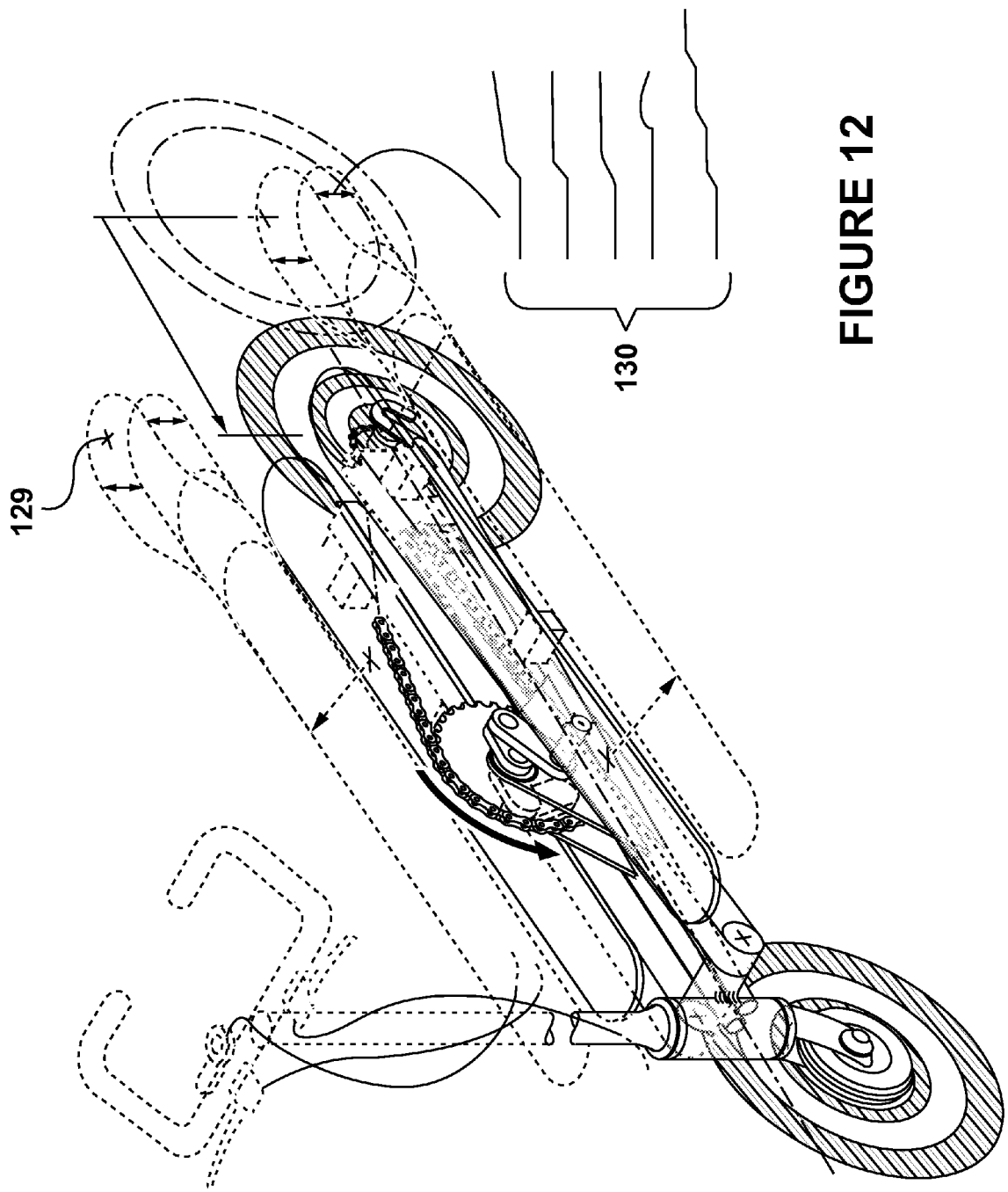
FIG. 12 is a perspective view of the pedal drive system depicted in FIG. 1, further illustrating a shortened frame (or longer pedal arms).

FIG. 12 shows the said pedal drive system of FIG. 1, shortened in length by further including the said at least one back wheel 14 moved forward, by either shortening the said frame 10 or lengthening, and also adding various slight or high-angled curving 130 at the curved pedal distal ends 129 of the said pedal arms 21, 22. As well, the said pedal arms could be potentially located outward with respect to the said frame axis A-A. Lastly, it is to be noted that the '544 patent places its similar pedal arms directly above its pedicycle frame, which, it is believed would impede the extent of pedal stroke, another structural limitation that the present invention avoids.

It is to be understood that the form of the invention herewith shown and described above is to be taken as preferred embodiments. Various changes may be made in the shape, size and arrangement of parts, for example: other equivalent elements may be substituted for those illustrated and described herein, parts and elements may be reversed, and certain features of the invention may be utilized independently of the use of other features, all without departing form the spirit or scope of the invention, as defined in the subjoining claims.

PEDAL-DRIVE SYSTEM FOR MULTI-WHEELED CYCLES

Listing and Numbering of Component Parts 9 pedal drive system
10 cycle frame
12 front wheel
12a, 12b, 12c, 12d
14 rear wheel(s)
14 a, 14b, 14c, 14d
21 first pedal arm
21a proximal end
21b distal end element
22 second pedal arm
22a proximal end
23 first support member mechanism
23b distal end
24 second support member
25 first platform
26 second platform
31 first two-bar linkage
31a first end
31b second end
32 second two-bar linkage
32a first end
32b second end
33 connector pin
34 connector pin
35 pedal crank or drive pin
36 pedal crank or drive pin
40 drive spindle
40a first end (left end)
40b second end (right end)
41 left spindle support bracket
43 right spindle support bracket
44 toothed member
45 pulley belt
46 toothed pulley or sprocket
47 toothed belt
48 gears or geared shaft
49 pulley wheel
50 flexible transmission element
52 toothed belt or chain
59 free wheel clutch mechanism
60 back wheel sprocket
62 second added transmission hub
63 third added transmission hub
70 optional drive assemblies
71 chain guard
74 gear assembly
80 second chain
81 third chain
82 handle bar
84 first brake assembly
86 second brake assembly
88 gear switch assembly
90 belt pulley assembly
92 tooth pulley assembly
94 seat assembly
96 seat hinge
98 multi-gearing speed hub
100 support member hinge
102 sprocket cone cassette
112 derailleur cable
114 derailleur third added transmission
116 second added transmission 118 electrical drive box
120 output disc
122 side support member
124 optional rotatable pedal
128 possible handle hinge area
129 curved pedal distal end
130 curved pedal end profiles Capital Letters Area A-A frame axis
B-B hinge axis
F outer bar
G inner bar
H outer bar
I inner bar
L', M', N' radial sections
L-L, M-M, N-N radius line distance
QR, QV intersecting angles
Q-Q, R-R, V-V intersecting lines
X' component scope point
Y' handle assembly
Z' hingable seal assembly

What is claimed is:

1. A pedal drive system for propelling a multi-wheeled cycle comprising:
a cycle frame having a steerable front wheel and at least one driven wheel; first and second pedal arms, each having a support member for supporting a respective foot of the user, and wherein each said support member is hingably supported by said cycle frame at a proximal end of said pedal arm;
a drive spindle, supported by said cycle frame between said first and second pedal arms, having a toothed member for transmitting a driving force to said at least one driven wheel, using a flexible transmission element and a rear wheel toothed member;
said pedal drive system further comprising first and second two-bar linkages connecting respective said pedal arms to the said drive spindle, wherein said two-bar linkages each further comprise an inner bar fixed to said drive spindle, and an outer bar connected to said inner bar, and wherein said inner bars have one connector crank pin each connected to the outer bar and the outer bar has one pedal crank pin, respectively, located between the distal and proximal ends of the said pedal arms connected to said pedal arm, the distance between the pedal crank pin and the proximal ends of the pedal arms being either longer by a radius distance line L-L or shorter by radius distance line M-M relative to a radial line distance N-N between the sprocket axis and the proximal ends, but not the same as N-N to avoid lock-down at end of stroke positions; and
wherein said each connector crank pin remains 180 degrees apart around the said drive spindle and are substantially offset either in front of or behind, but not over or aligned with top dead center and the drive spindle axis at end of stroke positions and wherein both said outer bar linkages have differing angular relationships with respect to the said respective inner bar linkages at said first and second pedals' end of stroke positions;
and wherein one or the other said first and second pedal arms can always apply rotating force to the said inner bars' connector crank pins without the necessity of rotational force being returned back to the said inner bars' connector crank pins by means of the rotation of the said driven wheel and said pedal arms and the first and second said two bar linkages are configured so as to rotate said drive spindle about its rotational axis per each pedal downward stroke, when one pedal arm is all the way down or at the bottom of its respective stroke, the opposite pedals' said pedal crank pin is already positioned beyond a top dead center of the drive spindle thus insuring continuous rotation of the drive system is sustained independently of the back drive wheel rotational momentum, and wherein such connector crank pin is not directly above or below, but substantially offset either in front of or behind, but not aligned above or below with the top dead center and the drive spindle at each stroke of the pedal at end of stroke positions and wherein both said outer bar linkages have differing angular relationships with respect to the said respective inner bar linkages at said first and second pedals' end of stroke positions to prevent pedal reversal or lockup;
and wherein the said drive system further includes a one-way clutching, freewheel mechanism.

2. The invention as recited in claim 1 wherein said drive member's said toothed member is a drive sprocket and said flexible drive member is a sprocket chain and wherein a free wheel sprocket hub is drivingly connected to the said at least one back wheel hub and wherein said second pedal arm's proximal end is hinged toward the front of the cycle frame and the said drive spindle is positioned on the side of the said proximal hinge toward the rearward end of the said cycle frame.

3. The invention as recited in claim 2 wherein between said drive member's said sprocket and said free wheel sprocket hub there is intervened two step up speed transmissions, further comprising a double sprocket and a chain that connects to the said free wheel sprocket hub.

4. The invention as recited in claim 2 wherein is further included a bicycle seat that is hingable and telescoping.

5. The invention as recited in claim 2 wherein the said front wheel and said at least one driven wheel are in the diameter size range of 3 inches to 27 inches.

6. The invention as recited in claim 2 wherein the toothed member is a gear that drives another gear combined with a sprocket that is connected by means of a chain to the said at least one driven wheel of said sprocket.

7. The invention as recited in claim 2 wherein multi-speed internal gear train is incorporated within the said free wheeling hub of the at least one driven wheel.

8. The invention as recited in claim 2 wherein is integrated a folding, hingable telescoping steering column within the said cycle frame.

9. The invention as recited in claim 2 wherein the said sprocket chain has connected thereat an auxiliary electric motor affixed to said cycle frame and drivingly engagable to said sprocket chain.

10. The invention as recited in claim 1 wherein said drive member's said toothed member is a drive sprocket and said flexible drive member is a sprocket chain and wherein a free wheel sprocket hub is drivingly connected to the said at least one driven wheel and wherein said second pedal arm's proximal end is hinged near the rearward of the frame and the said drive spindle is positioned on the side of the said proximal hinge to the forward end of the said cycle frame.

11. The invention as recited in claim 1 wherein said drive member's said toothed member is a toothed pulley and said flexible drive member is a toothed belt and wherein a free wheel toothed pulley hub is drivingly connected to the said at least one driven wheel; and wherein said second pedal arm's proximal end is hinged toward the front of the cycle frame and the said drive spindle is positioned on the side of the said proximal hinge to the rearward end of the said cycle frame.

12. The invention as recited in claim 1 wherein each said pedal arm further comprises one platform upon which a standing cycle user may stand and apply downward drive pressure and wherein said each pedal arm may further comprise variously curved distal ends.

13. The invention as recited in claim 1 wherein each said pedal arm further comprises a rotatable bicycle foot pedal that may further be inserted at various selectable positions along the length of said pedal arm.

14. The invention as recited in claim 1 further comprises a first brake assembly and a second brake assembly.

15. A pedal drive system for propelling a multi-wheeled cycle comprising:
 a cycle frame having a steerable front wheel and at least one driven wheel; first and second pedal arms, each having a support member for supporting a respective foot of the user, and wherein each said support member is hingably supported by said cycle frame at a proximal end of said pedal arm;
 a drive spindle, supported by said cycle frame between said first and second pedal arms, having a toothed member for transmitting a driving force to said at least one driven wheel, using a flexible transmission element and a rear wheel toothed member;
 said pedal drive system further comprising first and second two-bar linkages connecting respective said pedal arms to the said drive spindle, wherein said two-bar linkages each further comprise an inner bar fixed to said drive spindle, and an outer bar connected to said inner bar, and wherein said inner bars have one connector crank pin each connected to the outer bar and the outer bar has one pedal crank pin, respectively, located between the distal and proximal ends of the said pedal arms connected to said pedal arm, the distance between the pedal crank pin and the proximal ends of the pedal arms being either longer by a radius distance line L-L or shorter by radius distance line M-M relative to a radial line distance N-N between the sprocket axis and the proximal ends, but not the same as N-N to avoid lock-down at end of stroke positions; and
 wherein said each connector crank pin remains 180 degrees apart around the said drive spindle, and are substantially offset in front or behind, but not over or aligned with top center and the drive spindle at end of stroke positions and wherein both said outer bar linkages have differing angular relationships with respect to the said respective inner bar linkages at said first and second pedals' end of stroke positions;
 said pedal arms and the first and second said two bar linkages are configured so as to rotate said drive spindle about its rotational axis per each pedal downward stroke, when one pedal arm is all the way down or at the bottom of its respective stroke, the opposite pedals' said pedal crank pin is already positioned beyond a top dead center of the drive spindle thus insuring continuous rotation of the drive system is sustained independently of the driven wheel rotational momentum, and wherein such connector crank pin is not directly above or below, but substantially offset either in front of or behind, but not over or aligned with the top dead center and the drive spindle at each stroke of the pedal at end of stroke positions and wherein both said outer bar linkages have differing angular relationships with respect to the said respective inner bar linkages at said first and second pedals' end of stroke positions to prevent pedal reversal or lockup;
 and wherein the said drive system further includes a one-way clutching, freewheel mechanism.

16. A pedal drive system for propelling a multi-wheeled cycle comprising: a cycle frame having a steerable front wheel and at least one driven wheel; first and second pedal arms, each having a support member for supporting a respective foot of the user, and wherein each said support member is hingably supported by said cycle frame at a proximal end of said pedal arm;
 a drive spindle, supported by said cycle frame between said first and second pedal arms, having a toothed member for transmitting a driving force to said at least one driven wheel, using a flexible transmission element and a rear wheel toothed member and
 first and second two-bar linkages connecting respective said pedal arms to the said drive spindle wherein said two-bar linkages further comprise an inner bar, and an outer bar, and wherein said inner bars have one connector crank pin each, respectively, which remain 180 degrees apart around the said drive spindle, and are substantially offset in front or behind, but not over or aligned with top center and the drive spindle at end of stroke positions or wherein both said outer bar linkages have differing angular relationships with respect to the said respective inner bar linkages at said first and second pedals' end of stroke positions, and wherein both said outer bar linkages have differing angular relationships with respect to the said respective pedal arms at said first and second pedals' end of stroke positions; and
 wherein the distance between the rotational axis of the said drive spindle and the axis of the hingable point of the said proximal pedal arm must be either longer or shorter than the distance between the said proximal hinge point of the pedal arm and the pedal arm crank pin's central axis and said pedal arms and the first and second said two bar linkages are configured so as to rotate said drive spindle about its rotational axis per each pedal downward stroke, when one pedal arm is all the way down or at the bottom of its respective stroke, the opposite pedals' said pedal crank pin is already positioned beyond a top dead center of the drive spindle thus insuring continuous rotation of the drive system is sustained independently of the driven wheel rotational momentum, and wherein such connector crank pin is not directly above or below, but substantially offset either in front of or behind, but not over or aligned with the top dead center and the drive spindle at each stroke of the pedal at end of stroke positions and wherein both said outer bar linkages have differing angular relationships with respect to the said respective inner bar linkages at said first and second pedals' end of stroke positions to prevent pedal reversal or lockup;
 wherein the said drive system further includes a one-way clutching, freewheel mechanism, and wherein between said drive member's said sprocket and said free wheel sprocket hub there is intervened at least one speed step up transmission further comprising a double sprocket and second chain that connects to the said free wheel sprocket hub, wherein the said at least one speed step up transmission is a multi-sprocket cone with derailleur speed changing transmission.

17. The invention as recited in claim 16 wherein a standard number 41 bicycle chain or a number 35 industrial chain can be used on the said main drive spindle's sprocket and wherein the said intervened at least one speed step up transmission's said second chain that connects to the said free wheel sprocket hub is a lighter, smaller weight, number 25 chain and wherein the at least one said driven wheel's said sprocket is a number 25 sprocket.

18. The invention as recited in claim 16 wherein the said intervened at least one speed step up transmission further comprising a double sprocket further includes its said double sprocket positioned to the forward side, toward the front of the cycle frame so that the said drive spindle would be positioned behind said double sprocket, toward the rearward portion of the said cycle frame.

19. The invention as recited in claim 16 further comprises a first brake assembly and a second brake assembly.

* * * * *